US011487781B2

(12) United States Patent
Parashar (10) Patent No.: US 11,487,781 B2
(45) Date of Patent: Nov. 1, 2022

(54) VISUALIZING SPARSE MULTI-DIMENSIONAL DATA

(71) Applicant: International Business Machines Corporation, Armonk, NY (US)

(72) Inventor: Rahul Parashar, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 90 days.

(21) Appl. No.: 16/870,184

(22) Filed: May 8, 2020

(65) Prior Publication Data

US 2021/0349913 A1 Nov. 11, 2021

(51) Int. Cl.
*G06F 16/26* (2019.01)
*G06F 16/22* (2019.01)
*G06F 16/25* (2019.01)

(52) U.S. Cl.
CPC .......... *G06F 16/26* (2019.01); *G06F 16/2264* (2019.01); *G06F 16/258* (2019.01)

(58) Field of Classification Search
CPC ..... G06F 16/26; G06F 16/258; G06F 16/2264
See application file for complete search history.

(56) References Cited

U.S. PATENT DOCUMENTS

| 8,638,328 | B2 | 1/2014 | Lin |
| 2007/0211056 | A1 | 9/2007 | Chakraborty et al. |
| 2015/0032734 | A1 | 1/2015 | Mandel et al. |
| 2017/0193688 | A1 | 7/2017 | Djorgovski et al. |
| 2017/0221237 | A1 | 8/2017 | Pate et al. |

FOREIGN PATENT DOCUMENTS

WO 2019113299 A1 6/2019

OTHER PUBLICATIONS

Sarkar, Dipanjan. "The Art of Effective Visualization of Multi-Dimensional Data." Towards Data Science, Jan. 15, 2018, https://towardsdatascience.com/the-art-of-effective-visualization-of-multi-dimensional-data-6c7202990c57. (Year: 2018).*

(Continued)

*Primary Examiner* — William B Partridge
*Assistant Examiner* — Erich Alexander Fischer
(74) *Attorney, Agent, or Firm* — Robert A. Voigt, Jr.; Shackelford, Bowen, McKinley & Norton, LLP (57) ABSTRACT

A computer-implemented method, system and computer program product for visualizing sparse multi-dimensional data. A multi-dimensional dataset ("dataset") is converted into a three-dimensional architecture and the remaining dimensions, if any, are arranged into one or more planes. The sparse numeric data of the dataset is converted into multiple planes based on partitioning the three-dimensional architecture by the most sparse dimension and aligning the remaining two-dimensions as two-dimensional planes. Colors or shades of colors are assigned to these planes based on the density quantum of the data present in the planes. Furthermore, planes of the dataset are constructed using the assigned colors or shades of color and the defined opacity values of the planes. The constructed planes are mapped to the dataset in the form of a cube(s) and possibly two-dimensional planes, where the darkest color and the least translucent section(s) of the dataset are positioned in the center of the cube(s).

20 Claims, 5 Drawing Sheets

(56) References Cited

OTHER PUBLICATIONS

Steele, Julie, et al. "Chapter 4. Color: The Cinderella of Data Visualization." Beautiful Visualization, O'Reilly, Beijing, 2010, pp. 1-12. (Year: 2010).*
Wu, Qiannan, et al. "Multi-Dimensional Information Visualization Analysis of Business Circles and Products Based on Density Clustering." Elsevier Ltd, International Federation of Automatic Control, 2018, pp. 811-816. Sciencedirect, https://www.sciencedirect.com/science/article/pii/S2405896318312114 (Year: 2018).*

* cited by examiner

VISUALIZING SPARSE MULTI-DIMENSIONAL DATA

TECHNICAL FIELD

The present disclosure relates generally to analyzing multi-dimensional datasets, and more particularly to visualizing sparse multi-dimensional data.

BACKGROUND

An OLAP (online analytical processing) cube is a multi-dimensional array of data. Online analytical processing is a computer-based technique of analyzing data to look for insights. The term cube herein refers to a multi-dimensional dataset, which is also sometimes called a hypercube if the number of dimensions is greater than three.

SUMMARY

In one embodiment of the present disclosure, a computer-implemented method for visualizing sparse multi-dimensional data comprises converting a multi-dimensional dataset into a three-dimensional cascaded plane architecture and arranging remaining dimensions, if any, into one or more planes. The method further comprises converting sparse numeric data into multiple planes based on partitioning the three-dimensional cascaded plane architecture by a most sparse dimension and aligning remaining two-dimensions of the three-dimensional cascaded plane architecture as two-dimensional planes. The method additionally comprises defining opacity values of the multiple planes and the one or more planes, if any, based on sparsity quantum of data present in the multiple planes and the one or more planes, if any, by applying a translucency algorithm. Furthermore, the method comprises assigning colors or shades of colors to the multiple planes and the one or more planes, if any, based on density quantum of data present in the multiple planes and the one or more planes, if any, using an interpolation algorithm. Additionally, the method comprises constructing planes of the multi-dimensional dataset using the assigned colors or shades of colors and the defined opacity values of the multiple planes and the one or more planes, if any. In addition, the method comprises mapping the constructed planes to the multi-dimensional dataset in a form of one or more cubes and zero or more two-dimensional planes, where the one or more cubes and the zero or more two-dimensional planes are color coded to indicate sparsity of data present in that dimension. The method further comprises positioning one or more darkest color and least translucent sections of the multi-dimensional dataset in a center of the one or more cubes displayed in a graphical user interface from which a user analysis should begin. The method additionally comprises displaying the one or more cubes and the zero or more two-dimensional planes to a user via the graphical user interface in response to positioning the one or more darkest color and least translucent sections of the multi-dimensional dataset in a center of the one or more cubes.

Other forms of the embodiment of the computer-implemented method described above are in a system and in a computer program product.

The foregoing has outlined rather generally the features and technical advantages of one or more embodiments of the present disclosure in order that the detailed description of the present disclosure that follows may be better understood. Additional features and advantages of the present disclosure will be described hereinafter which may form the subject of the claims of the present disclosure.

BRIEF DESCRIPTION OF THE DRAWINGS

A better understanding of the present disclosure can be obtained when the following detailed description is considered in conjunction with the following drawings, in which.

DETAILED DESCRIPTION

As stated in the Background section, an OLAP (online analytical processing) cube is a multi-dimensional array of data. Online analytical processing is a computer-based technique of analyzing data to look for insights. The term cube herein refers to a multi-dimensional dataset, which is also sometimes called a hypercube if the number of dimensions is greater than three.

Currently, multi-dimensional datasets are analyzed using cube-based graphical user interfaces. Typically, the graphical user interface will depict two dimensions, such as rows and columns, where the remaining dimension(s) may be depicted via a drop down menu. However, such a graphical user interface architecture does not allow the user to start the analysis from the dense area of the multi-dimensional data. The "dense area," as used herein, refers to the location of the concentration of data within the multi-dimensional data. The "sparse area," as used herein, refers to the location of the absence of data within the multi-dimensional data.

In a highly sparse cube, data is only present at a very small subset of the combination of dimensions. In such a case, the user may spend quite a lot of valuable time in determining where data exists in the multi-dimensional cube.

Currently, one way to address such an issue is to cascade multiple dimensional elements against which data exists in rows and then to suppress the zero values by rows so that only those rows that do have values are left. A user may then start the analysis based on those cascaded rows that have data.

However, there may be hundreds or thousands of rows depending on the number of dimensions in the multi-dimensional data, even if the rows containing zero values were suppressed, thereby resulting in an excessive amount of analysis time spent by a user as well as an excessive amount of computing resources being utilized by a computing system.

The embodiments of the present disclosure provide a means for enabling the user to start the analysis of the multi-dimensional dataset where the most dense data is located within the dataset by depicting the location of the most dense data within the multi-dimensional dataset.

In some embodiments, the present disclosure comprises a computer-implemented method, system and computer program product for visualizing sparse multi-dimensional data. In one embodiment of the present disclosure, a multi-dimensional dataset is converted into one or more three-dimensional cascaded plane architectures and the remaining dimensions, if any, are arranged into one or more planes (e.g., two-dimensional planes) ("remaining planes"). The sparse numeric data is converted into multiple planes based on partitioning the three-dimensional cascaded plane architecture(s) by the most sparse dimension and aligning the remaining two-dimensions of the three-dimensional cascaded plane architecture as two-dimensional planes (collectively the "multiple planes"). In one embodiment, the dimensions are ordered based on the number of dense element slices. The dimension with the least amount of dense element slices is the "most sparse" dimension. "Sparse numeric data," as used herein, refers to the data in the multi-dimensional dataset that includes a null or zero value. Furthermore, in one embodiment, "partitioning," as used herein, refers to separating the data associated with the most sparse dimension from the other data of the other dimensions. The sparsity quantum of data of the planes (the multiple planes and the remaining planes, if any, referenced above) may then be calculated using the density quantum of data present in the planes. "Density quantum of data," as used herein, refers to the quantity of data with non-zero values out of the total values/cells present. The "sparsity quantum of data," as used herein, refers to the quantity of data with null or zero values out of the total values/cells present. In one embodiment, the "sparsity quantum of data" of the planes is based on the lack of the density quantum of data of the plane. That is, the greater the quantity of the density quantum of data of the plane, the lower the sparsity quantum of data of the plane and vice-versa. Furthermore, the opacity values of the planes (the multiple planes and the remaining planes, if any, referenced above) are defined based on the sparsity quantum of data present in the planes by applying a translucency algorithm. In one embodiment, "opacity values," as used herein, refer to the degree that the values of data of these planes are zero or null values. A color, or a lack of color, may be associated with a plane to indicate the degree that the values of data of the plane are zero or non-zero. Additionally, the colors or shades of colors are assigned to the planes based on the density quantum of data present in the planes using an interpolation algorithm. In one embodiment, the colors or shades of colors are a function of the relative density of data in that dimension for that plane. Furthermore, the planes of the multi-dimensional data are constructed using the assigned colors or shades of color and the defined opacity values of the planes. Such planes may be color-coded based on the sparsity of the data present on that plane. The constructed planes are then mapped to the multi-dimensional dataset in the form of one or more cubes and zero or more two-dimensional planes. Furthermore, the darkest color and the least translucent section(s) of the multi-dimensional dataset are positioned in the center of one or more cubes in the graphical user interface from which the user analysis should begin. The one or more cubes and the zero or more two-dimensional planes are then displayed to the user via the graphical user interface. The darkest color and the least translucent section of the multi-dimensional dataset corresponds to the area of the dataset with the greatest density of data. In this manner, the user will be able to initialize the analysis of the dataset at the greatest density of data thereby lessening the time spent by the user in attempting to locate the data of the multi-dimensional dataset. Furthermore, computing resources are now more efficiently utilized since less analysis time will need to be spent in analyzing the multi-dimensional dataset.

In the following description, numerous specific details are set forth to provide a thorough understanding of the present disclosure. However, it will be apparent to those skilled in the art that the present disclosure may be practiced without such specific details. In other instances, well-known circuits have been shown in block diagram form in order not to obscure the present disclosure in unnecessary detail. For the most part, details considering timing considerations and the like have been omitted inasmuch as such details are not necessary to obtain a complete understanding of the present disclosure and are within the skills of persons of ordinary skill in the relevant art.

Figure 1:
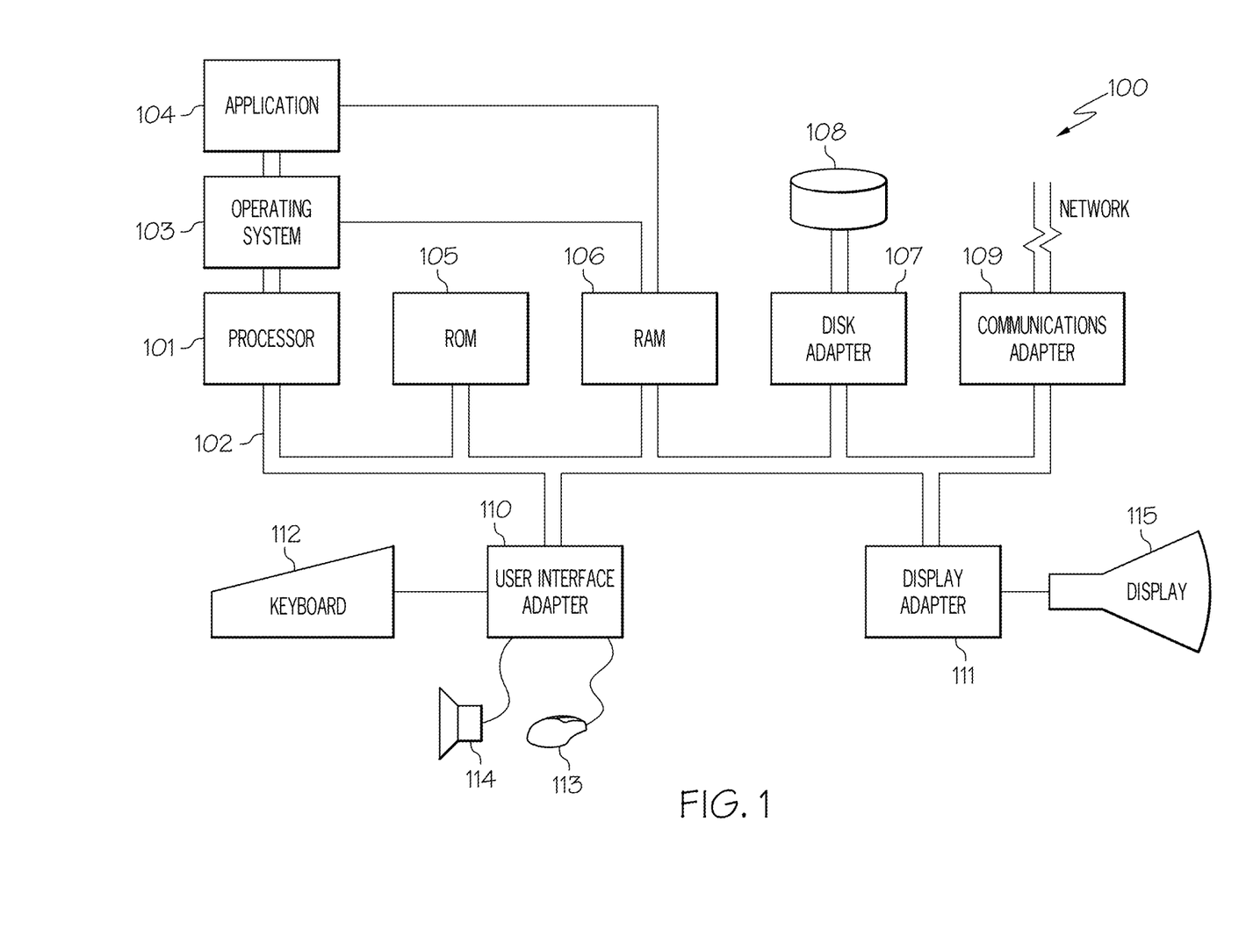
FIG. 1 illustrates an embodiment of the present disclosure of a hardware configuration of a computing device.

Referring now to the Figures in detail, FIG. 1 illustrates an embodiment of the present disclosure of the hardware configuration of a computing device 100 which is representative of a hardware environment for practicing the present disclosure. Computing device 100 may be any type of computing device (e.g., portable computing unit, Personal Digital Assistant (PDA), laptop computer, mobile device, tablet personal computer, smartphone, mobile phone, navigation device, gaming unit, desktop computer system, workstation, Internet appliance and the like) configured with the capability of visualizing sparse multi-dimensional data. Referring to FIG. 1, computing device 100 may have a processor 101 connected to various other components by system bus 102. An operating system 103 may run on processor 101 and provide control and coordinate the functions of the various components of FIG. 1. An application 104 in accordance with the principles of the present disclosure may run in conjunction with operating system 103 and provide calls to operating system 103 where the calls implement the various functions or services to be performed by application 104. Application 104 may include, for example, a program for visualizing sparse multi-dimensional data as discussed below in connection with FIGS. 2-6.

Referring again to FIG. 1, read-only memory ("ROM") 105 may be connected to system bus 102 and include a basic input/output system ("BIOS") that controls certain basic functions of computing device 100. Random access memory ("RAM") 106 and disk adapter 107 may also be connected to system bus 102. It should be noted that software components including operating system 103 and application 104 may be loaded into RAM 106, which may be computing device's 100 main memory for execution. Disk adapter 107 may be an integrated drive electronics ("IDE") adapter that communicates with a disk unit 108, e.g., disk drive. It is noted that the program for visualizing sparse multi-dimensional data, as discussed below in connection with FIGS. 2-6, may reside in disk unit 108 or in application 104.

Computing device 100 may further include a communications adapter 109 connected to bus 102. Communications adapter 109 may interconnect bus 102 with an outside network thereby allowing computing device 100 to communicate with other devices.

I/O devices may also be connected to computing device 100 via a user interface adapter 110 and a display adapter 111. Keyboard 112, mouse 113 and speaker 114 may all be interconnected to bus 102 through user interface adapter 110. A display monitor 115 may be connected to system bus 102 by display adapter 111. In this manner, a user is capable of inputting to computing device 100 through keyboard 112 or mouse 113 and receiving output from computing device 100 via display 115 or speaker 114. Other input mechanisms may be used to input data to computing device 100 that are not shown in FIG. 1, such as display 115 having touch-screen capability and keyboard 112 being a virtual keyboard. Computing device 100 of FIG. 1 is not to be limited in scope to the elements depicted in FIG. 1 and may include fewer or additional elements than depicted in FIG. 1.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As stated above, in a highly sparse cube, data is only present at a very small subset of the combination of dimensions. In such a case, the user may spend quite a lot of valuable time in determining where data exists in the multi-dimensional cube. Currently, one way to address such an issue is to cascade multiple dimensional elements against which data exists in rows and then to suppress the zero values by rows so that only those rows that do have values are left. A user may then start the analysis based on those cascaded rows that have data. However, there may be hundreds or thousands of rows depending on the number of dimensions in the multi-dimensional data, even if the rows containing zero values were suppressed, thereby resulting in an excessive amount of analysis time spent by a user as well as an excessive amount of computing resources being utilized by a computing system.

Figure 2:
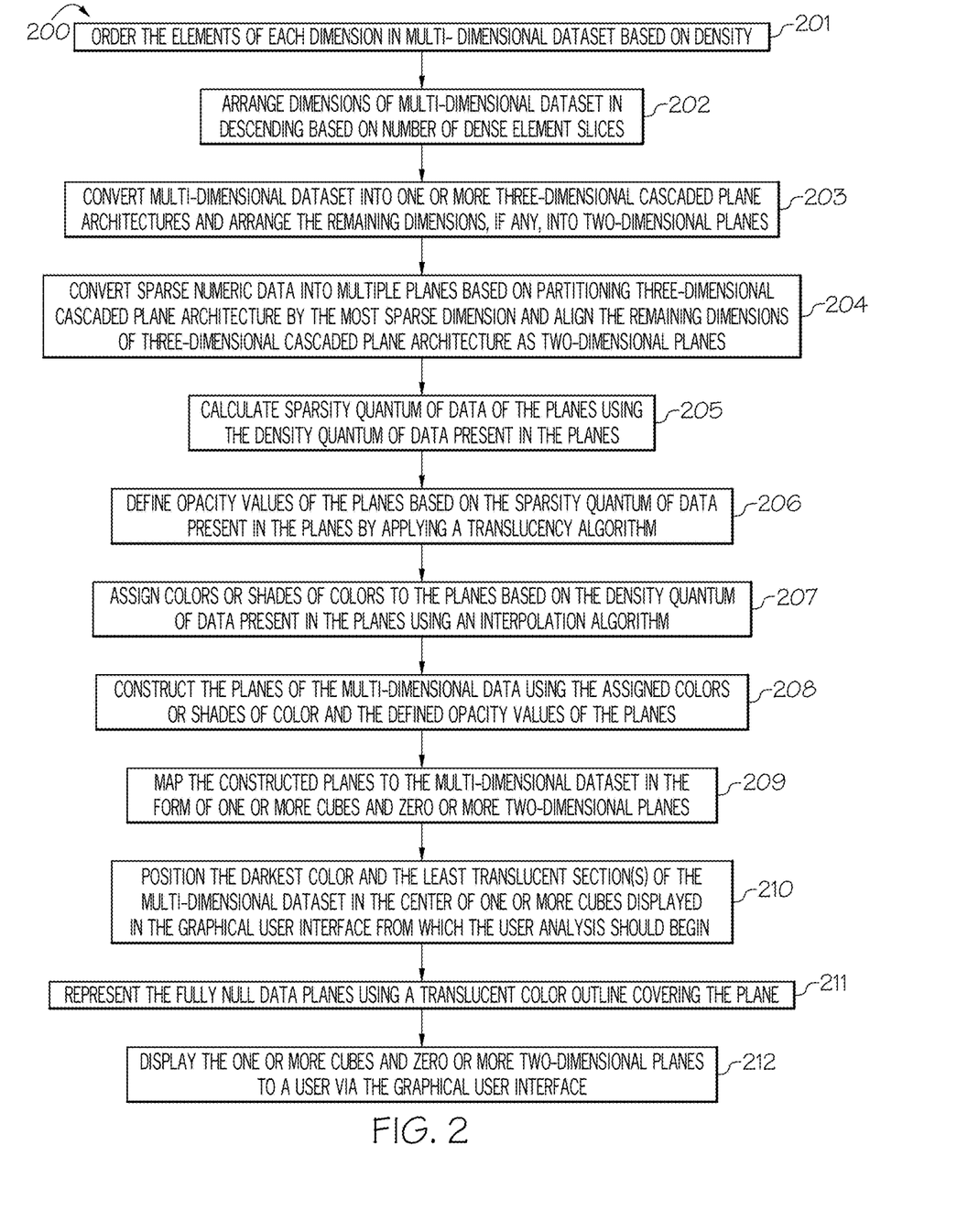
FIG. 2 is a flowchart of a method for visualizing sparse multi-dimensional data in accordance with an embodiment of the present disclosure.
Figure 3:
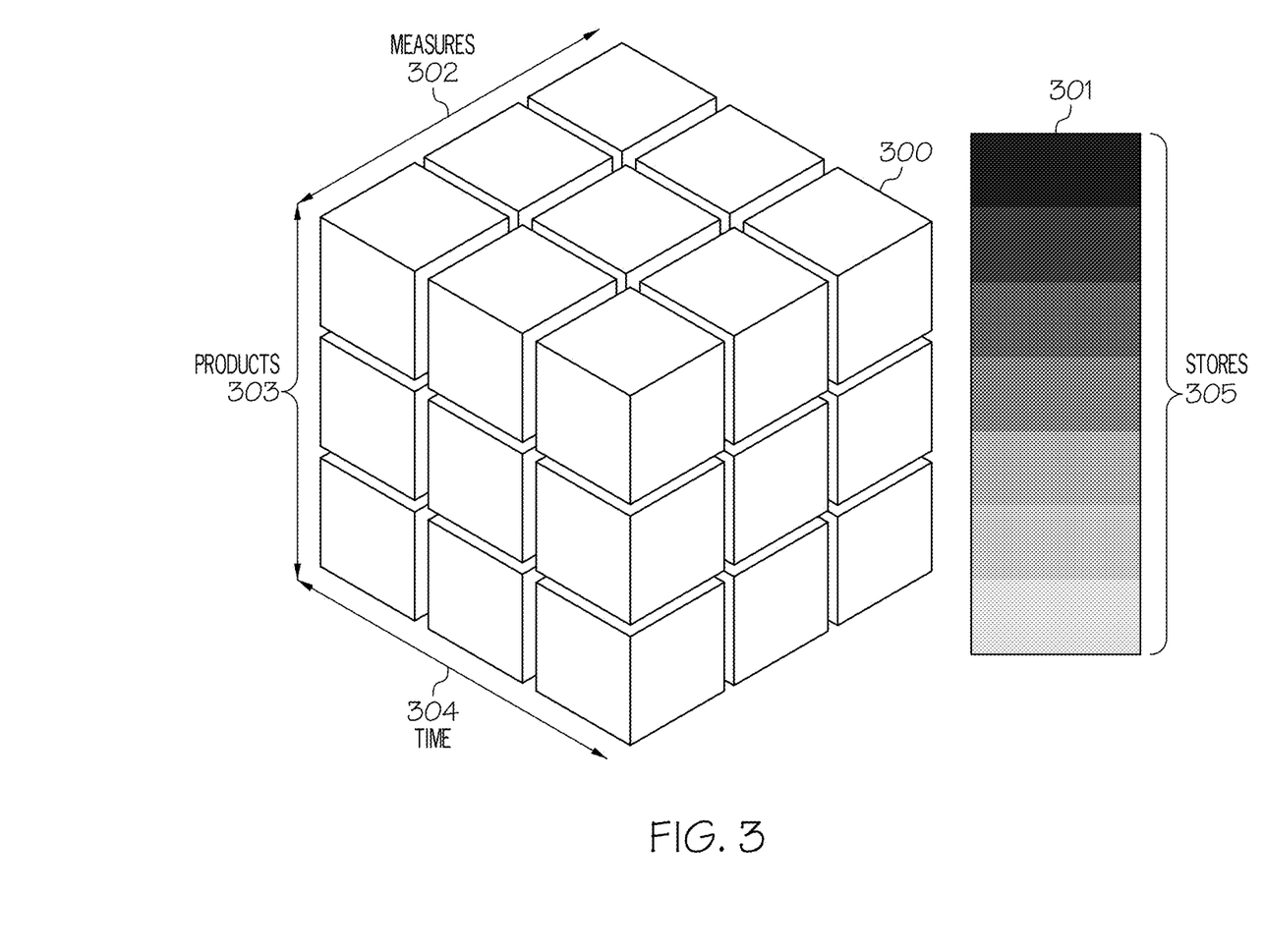
FIG. 3 illustrates a visualization of the three-dimensional cascaded plane architecture and a two-dimensional plane in accordance with an embodiment of the present disclosure.
Figure 4:
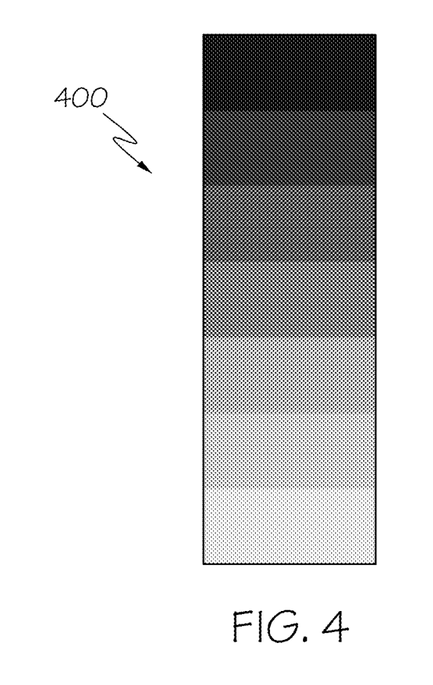
FIG. 4 illustrates a two-dimensional plane where the color or shade of the two-dimensional plane is based on the sparsity of the data present on that plane in accordance with an embodiment of the present disclosure.
Figure 5:
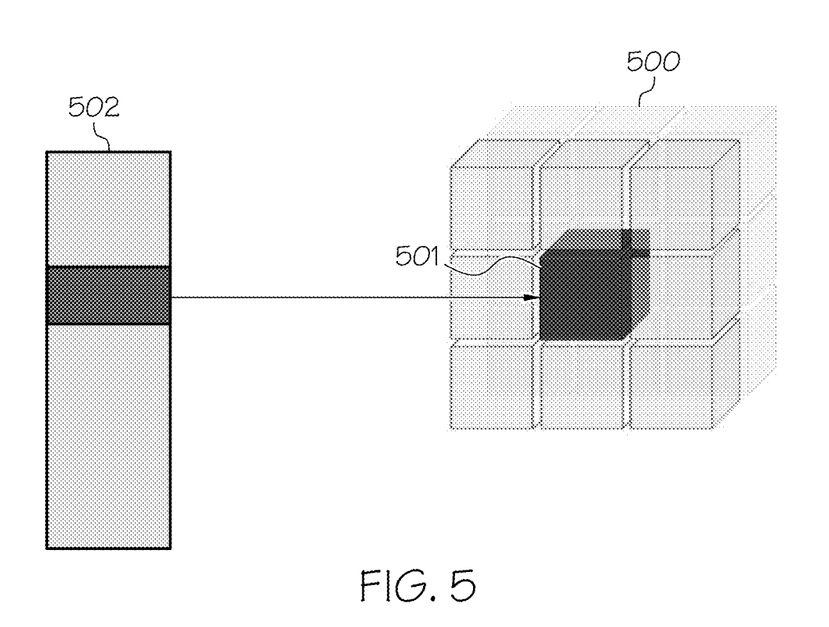
FIG. 5 illustrates that the greatest density of data is positioned in the center of the cube in accordance with an embodiment of the present disclosure.
Figure 6:
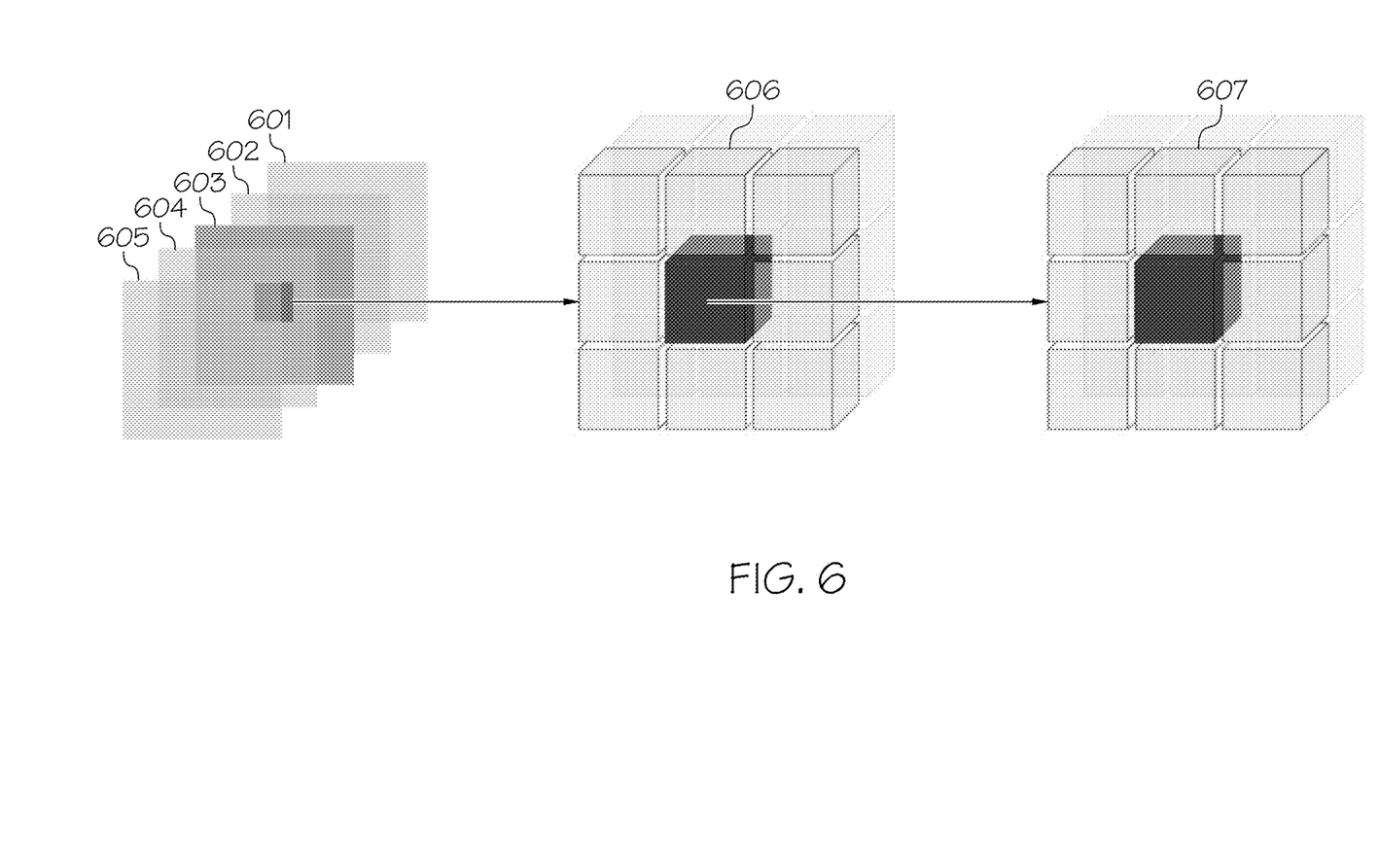
FIG. 6 illustrates that the greatest density of data is positioned in the center of each of the multiple cubes for a multi-dimensional data set that is greater than four dimensions in accordance with an embodiment of the present disclosure.

The embodiments of the present disclosure provide the means for enabling the user to start the analysis of the multi-dimensional dataset where the most dense data is located within the dataset by depicting the location of the most dense data within the multi-dimensional dataset as discussed below in connection with FIGS. 2-6. FIG. 2 is a flowchart of a method for visualizing sparse multi-dimensional data. FIG. 3 illustrates a visualization of the three-dimensional cascaded plane architecture and a two-dimensional plane. FIG. 4 illustrates a two-dimensional plane where the color or shade of the two-dimensional plane is based on the sparsity of the data present on that plane. FIG. 5 illustrates that the greatest density of data is positioned in the center of the cube. FIG. 6 illustrates that the greatest density of data is positioned in the center of each of the multiple cubes for a multi-dimensional data set that is greater than four dimensions.

As stated above, FIG. 2 is a flowchart of a method 200 for visualizing sparse multi-dimensional data in accordance with an embodiment of the present disclosure.

Referring to FIG. 2, in conjunction with FIG. 1, in operation 201, computing device 100 orders the elements of each dimension in the multi-dimensional dataset based on density, such as the density quantum of data. "Density," as used herein, refers to the concentration of data within the multi-dimensional data. "Element," as used herein, refers to an item of the dimension. In one embodiment, an element of the multi-dimensional dataset is accessed by accessing a dimension with a single subscript (e.g., row index, column index) of the multi-dimensional array. If such an element has subscripts of non-zero values, then such an element may be deemed to be "dense." Those elements that have more subscripts of non-zero values are deemed to be more dense than elements with fewer subscripts of non-zero values. In one embodiment, computing device 100 utilizes a density grid clustering algorithm to order the elements of each dimension in the multi-dimensional dataset based on density.

As discussed above, the elements of each dimension in the multi-dimensional dataset are ordered based on density, such as the density quantum of data. "Density quantum of data," as used herein, refers to the quantity of data with non-zero values out of the total values/cells present. In one embodiment, the density quantum of data may be calculated based on the total number of non-zero cells divided by the total number of cells.

In another embodiment, the density quantum of data may be calculated by utilizing a function $f(x)$ on each cell value x and finding a value $y=f(x)$ and then using sigma(y) divided by sigma(x) to calculate the density quantum. In this example, $f(x)$ is the density quantum calculation function. In the prior example discussed above, $y=f(x) \Rightarrow y=\{$if x !=0, y=1\}$.

In operation 202, computing device 100 arranges the dimensions of the multi-dimensional dataset in descending order based on the number of dense elements (also referred to as "dense element slices"). In one embodiment, an element slice may be classified as being a "dense element slice" if such an element slice has subscripts of non-zero values, including a specific number of non-zero values or a designated percentage of non-zero values. Based on the number of such element slices, the dimensions of the multi-dimensional dataset are arranged in descending order. For example, if a first dimension has a greater number of dense element slices than a second dimension, then the first dimension is arranged prior to the second dimension.

In operation 203, computing device 100 converts the multi-dimensional dataset into one or more three-dimensional cascaded plane architectures and arranges the remaining dimensions, if any, into two-dimensional planes (e.g., a group of cascaded two-dimensional planes) ("remaining planes") as shown in FIG. 3. For example, if the multi-dimensional dataset is a three-dimensional data set, then computing device 100 would convert the dataset into a three-dimensional cascaded plan architecture. If, however, the multi-dimensional dataset is a four-dimensional data set, then computing device 100 would convert the dataset into a three-dimensional cascaded plan architecture and a two-dimensional plane. In another example, if the multi-dimensional dataset is a five-dimensional data set, then computing device 100 would convert the dataset into a three-dimensional cascaded plan architecture and a group of two cascaded two-dimensional planes. In a further example, if the multi-dimensional dataset is a six-dimensional data set, then computing device 100 would convert the dataset into two three-dimensional cascaded plan architectures.

Referring to FIG. 3, FIG. 3 illustrates a visualization of the three-dimensional cascaded plane architecture and a two-dimensional plane in accordance with an embodiment of the present disclosure. As shown in FIG. 3, a four-dimensional dataset may be converted into a three-dimensional cascaded plane architecture 300 and a two-dimensional plane 301. The three-dimensional cascaded plane architecture 300 includes the three dimensions of measures 302, products 303 and time 304 and two-dimensional plane 301 includes the dimension of stores 305. For example, suppose that the multi-dimensional dataset included the dimensions of products, time, stores and measures. The dataset may then be separated into a three-dimensional cube 300 and one linear two-dimensional plane 301. For instance, the dimensions of measures 302, products 303 and time 304 may be utilized in three-dimensional cube 300 and the dimension of stores 305 may then be shown as a two-dimensional plane 301. In one embodiment, the color or shade of two-dimensional plane 301 is based on the sparsity of the data present on that plane in accordance with an embodiment of the present disclosure as discussed further below in connection with FIG. 4.

Returning to FIG. 2, in conjunction with FIGS. 1 and 3, in operation 204, computing device 100 converts the sparse numeric data into multiple planes based on partitioning three-dimensional cascaded plane architecture 300 by the most sparse dimension and aligning the remaining two dimensions of three-dimensional cascaded plane architecture 300 into two-dimensional planes (collectively these planes form the "multiple planes" of operation 204). Such planes (the previously referenced "multiple planes" of operation 204 and the previously referenced "remaining planes," if any, of operation 203) may collectively be referred to hereinafter as simply "planes." As discussed above, the dimensions are ordered based on the number of dense element slices. The dimension with the least amount of dense element slices is the "most sparse" dimension. "Sparse numeric data," as used herein, refers to the data in the multi-dimensional dataset that includes a null or zero value.

In one embodiment, "partitioning," as used herein, refers to separating the data associated with the most sparse dimension from the other data of the other dimensions. Such partitioned data may be stored in a container. In one embodiment, partitioning is accomplished by the Cube Partitioning Adviser from Oracle®.

In operation 205, computing device 100 calculates the sparsity quantum of data of the planes (the multiple planes and the remaining planes, if any, referenced above) using the density quantum of data present in the planes. As discussed above, "density quantum of data," as used herein, refers to the quantity of data with non-zero values out of the total values/cells present. The "sparsity quantum of data," as used herein, refers to the quantity of null or zero values out of the total values/cells present. In one embodiment, the "sparse quantum of data" and the "density quantum of data" may be based on a particular type of data used in each dimension of the multi-dimensional dataset. For example, the density quantum of data/sparse quantum of data may be based on the quantity of products sold or the value of the quantity of products sold. For instance, if 20 products were sold in January at a total value of $1 million and 50 products were sold in February at a total value of $100, then February would be deemed to be the dense element if density were based on the quantity of products sold. However, January would be deemed to be the dense element if density were based on the value of the products sold.

In one embodiment, the "sparsity quantum of data" of the planes is based on the lack of the density quantum of data of the plane. That is, the greater the quantity of the density quantum of data of the plane, the lower the sparsity quantum of data of the plane and vice-versa. In one embodiment, the sparsity quantum of data of the planes is computed using an interpolation algorithm, such as linear interpolation, polynomial interpolation, spline interpolation, etc. For example, in two-dimensional plane 301 with the dimension of stores, such data may include both zero and non-zero values. The sparsity quantum of data of such a plane may be calculated using the density quantum of data present in the stores data in the plane. The density quantum of data may be identified in the plane using an interpolation algorithm, which is used to determine the sparsity quantum of the plane. In one embodiment, the sparsity quantum of data of the plane may correspond to a value that corresponds to an indication of how sparse the data is present in the plane. In one embodiment, such a value is normalized to correspond to a user-designated range, such as from 0 to 1.

In one embodiment, computing device 100 reduces the amount of the sparsity quantum of data or the density quantum of data based on the dimensional information available to be captured or to be displayed. For example, if the dimensional information available to be captured or to be displayed is limited, then the amount of the sparsity quantum of data or the density quantum of data needs to be limited accordingly.

In operation 206, computing device 100 defines the opacity values of the planes (the multiple planes and the remaining planes, if any, referenced above) based on the sparsity quantum of data present in the planes by applying a translucency algorithm. As discussed above, the "sparsity quantum of data," as used herein, refers to the quantity of null or zero values. In one embodiment, "opacity values," as used herein, refer to the degree that the values of data of these planes are zero or null values. A color, or a lack of color, may be associated with a plane to indicate the degree that the values of data of the plane are zero or non-zero. In one embodiment, the opacity values are normalized to have values between 0 and 1, where the higher value indicates a greater opacity value (greater number of data with zero or null values). Examples of such a translucency algorithm include transfer functions assigning an opacity, such as opacity functions.

In operation 207, computing device 100 assigns colors or shades of colors to the planes based on the density quantum of data present in the planes using an interpolation algorithm. In one embodiment, the colors or shades of colors are a function of the relative density of data in that dimension for that plane. For example, darker colors or darker shades may indicate a greater density of data in that area of the data in that dimension for the plane and the lighter colors or lighter shades may indicate a greater sparsity of data in that area of the data in that dimension for the plane. In one embodiment, the interpolation algorithm assigns the colors or shades of colors from a multi-color map having colors that are easily distinguishable to the human eye. In one embodiment, such interpolation algorithms utilize linear interpolation, polynomial interpolation, spline interpolation, etc., to assign colors or shades of colors based on the density quantum of data present in the planes. In one embodiment, such interpolation algorithms include the inverse distance weighted algorithm, natural neighbor inverse distance weighted algorithm, spline algorithm, kriging algorithm, PointInterp algorithm, etc.

In operation 208, computing device 100 constructs the planes of the multi-dimensional data using the assigned colors or shades of color and the defined opacity values of the planes. Such planes may be color-coded based on the sparsity of the data present on that plane as shown in FIG. 4.

Referring to FIG. 4, FIG. 4 illustrates a two-dimensional plane 400 where the color or shade of the two-dimensional plane is based on the sparsity of the data present on that plane in accordance with an embodiment of the present disclosure. For instance, in one embodiment, the lighter the shade, the greater the sparsity. For example, as shown in FIG. 4, the sparsity of the data is greater at the bottom portion of plane 400 versus the top portion of plane 400 as shown by the lighter shading at the bottom portion of plane 400.

In one embodiment, if the number of color and translucent planes are deemed to be too many, such as exceeding a user-designated threshold, then a loss based algorithm may be applied to reduce the number of planes. In such a manner, it may result in a more clear distinction between the number of sparse planes and the number of dense planes from which the user may select.

Retuning to FIG. 2, in conjunction with FIGS. 1 and 3-4, in operation 209, computing device 100 maps the constructed planes to the multi-dimensional dataset in the form of one or more cubes and zero or more two-dimensional planes as previously shown in FIG. 3.

In operation 210, computing device 100 positions the darkest color and the least translucent section(s) of the multi-dimensional dataset in the center of one or more cubes displayed in the graphical user interface from which the user analysis should begin as shown in FIG. 5. The darkest color and the least translucent section(s) of the dataset correspond to the area of the dimension with the greatest density of data.

Referring to FIG. 5, FIG. 5 illustrates that the greatest density of data 501 is positioned in the center of the cube 500 in accordance with an embodiment of the present disclosure. As shown in FIG. 5, for a four-dimensional data set, the data set may be depicted as a cube 500 along with a two-dimensional plane 502.

The darkest color and the least translucent section of the multi-dimensional dataset 501 corresponds to the area of the dataset with the greatest density of data. In this manner, the user will be able to initialize the analysis of the dataset at the greatest density of data thereby lessening the time spent by the user in attempting to locate the data of the multi-dimensional dataset. Furthermore, computing resources are now more efficiently utilized since less analysis time will need to be spent in analyzing the multi-dimensional dataset.

As discussed above, FIG. 5 illustrates visually displaying the sparse (and not sparse) data for a four-dimensional dataset. For a dataset with greater than four dimensions, the greatest density of data will be positioned in each of the centers of the multiple cubes as shown in FIG. 6.

Referring to FIG. 6, FIG. 6 illustrates that the greatest density of data is positioned in the center of each of the multiple cubes for a multi-dimensional data set that is greater than four dimensions in accordance with an embodiment of the present disclosure. For example, as shown in FIG. 6, there are 5 dimensions 601-605, in which the greatest density of data from these dimensions of data is positioned in the center of cube 606, where such a center of cube 606 points to a subsequent cube 607 containing such data indicated with the darkest shade.

In one embodiment, the dense data may be grouped using color interpolation and may be represented using semi or fully transparent data nodes or cells.

In one embodiment, the translucency and the colors are a function of the relative density of the data in the dimension.

In operation 211, computing device 100 represents the fully null data planes (planes with data containing only null or zero values) using a translucent color outline covering the plane.

In operation 212, computing device 100 displays the one or more cubes and the zero or more two-dimensional planes to a user (e.g., user of computing device 100) via the graphical user interface as shown in FIGS. 5 and 6.

As a result of the foregoing, embodiments of the present disclosure provide a means for enabling the user to start the analysis of the multi-dimensional dataset where the most dense data is located within the dataset by depicting the location of the most dense data within the multi-dimensional dataset.

Furthermore, the present disclosure improves the technology or technical field involving analyzing multi-dimensional datasets. As discussed above, an OLAP (online analytical processing) cube is a multi-dimensional array of data. Online analytical processing is a computer-based technique of analyzing data to look for insights. The term cube herein refers to a multi-dimensional dataset, which is also sometimes called a hypercube if the number of dimensions is greater than three. Currently, multi-dimensional datasets are analyzed using cube-based graphical user interfaces. Typically, the graphical user interface will depict two dimensions, such as rows and columns, where the remaining dimension(s) may be depicted via a drop down menu. However, such a graphical user interface architecture does not allow the user to start the analysis from the dense area of the multi-dimensional data. The "dense area," as used herein, refers to the location of the concentration of data within the multi-dimensional data. The "sparse area," as used herein, refers to the location of the absence of data within the multi-dimensional data. In a highly sparse cube, data is only present at a very small subset of the combination of dimensions. In such a case, the user may spend quite a lot of valuable time in determining where data exists in the multi-dimensional cube. Currently, one way to address such an issue is to cascade multiple dimensional elements against which data exists in rows and then to suppress the zero values by rows so that only those rows that do have values are left. A user may then start the analysis based on those cascaded rows that have data. However, there may be hundreds or thousands of rows depending on the number of dimensions in the multi-dimensional data, even if the rows containing zero values were suppressed, thereby resulting in an excessive amount of analysis time spent by a user as well as an excessive amount of computing resources being utilized by a computing system.

Embodiments of the present disclosure improve such technology by converting a multi-dimensional dataset into one or more three-dimensional cascaded plane architectures and arranging the remaining dimensions, if any, into one or more planes (e.g., two-dimensional planes) ("remaining planes"). The sparse numeric data is converted into multiple planes based on partitioning the three-dimensional cascaded plane architecture(s) by the most sparse dimension and aligning the remaining two-dimensions of the three-dimensional cascaded plane architecture as two-dimensional planes (collectively the "multiple planes"). In one embodiment, the dimensions are ordered based on the number of dense element slices. The dimension with the least amount of dense element slices is the "most sparse" dimension. "Sparse numeric data," as used herein, refers to the data in the multi-dimensional dataset that includes a null or zero value. Furthermore, in one embodiment, "partitioning," as used herein, refers to separating the data associated with the most sparse dimension from the other data of the other dimensions. The sparsity quantum of data of the planes (the multiple planes and the remaining planes, if any, referenced above) may then be calculated using the density quantum of data present in the planes. "Density quantum of data," as used herein, refers to the quantity of data with non-zero values out of the total values/cells present. The "sparsity quantum of data," as used herein, refers to the quantity of data with null or zero values out of the total values/cells present. In one embodiment, the "sparsity quantum of data" of the planes is based on the lack of the density quantum of data of the plane. That is, the greater the quantity of the density quantum of data of the plane, the lower the sparsity quantum of data of the plane and vice-versa. Furthermore, the opacity values of the planes (the multiple planes and the remaining planes, if any, referenced above) are defined based on the sparsity quantum of data present in the planes by applying a translucency algorithm. In one embodiment, "opacity values," as used herein, refer to the degree that the values of data of these planes are zero or null values. A color, or a lack of color, may be associated with a plane to indicate the degree that the values of data of the plane are zero or non-zero. Additionally, the colors or shades of colors are assigned to the planes based on the density quantum of data present in the planes using an interpolation algorithm. In one embodiment, the colors or shades of colors are a function of the relative density of data in that dimension for that plane. Furthermore, the planes of the multi-dimensional data are constructed using the assigned colors or shades of color and the defined opacity values of the planes. Such planes may be color-coded based on the sparsity of the data present on that plane. The constructed planes are then mapped to the multi-dimensional dataset in the form of one or more cubes and zero or more two-dimensional planes. Furthermore, the darkest color and the least translucent section(s) of the multi-dimensional dataset are positioned in the center of one or more cubes in the graphical user interface from which the user analysis should begin. The one or more cubes and the zero or more two-dimensional planes are then displayed to the user via the graphical user interface. The darkest color and the least translucent section of the multi-dimensional dataset corresponds to the area of the dataset with the greatest density of data. In this manner, the user will be able to initialize the analysis of the dataset at the greatest density of data thereby lessening the time spent by the user in attempting to locate the data of the multi-dimensional dataset. Furthermore, computing resources are now more efficiently utilized since less analysis time will need to be spent in analyzing the multi-dimensional dataset. Additionally, in this manner, there is an improvement in the technical field involving analyzing multi-dimensional datasets.

The technical solution provided by the present disclosure cannot be performed in the human mind or by a human using a pen and paper. That is, the technical solution provided by the present disclosure could not be accomplished in the human mind or by a human using a pen and paper in any reasonable amount of time and with any reasonable expectation of accuracy without the use of a computer.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A computer-implemented method for visualizing sparse multi-dimensional data, the method comprising:
    converting a multi-dimensional dataset into a three-dimensional cascaded plane architecture and arranging remaining dimensions, if any, into one or more planes;
    converting sparse numeric data into multiple planes based on partitioning said three-dimensional cascaded plane architecture by a most sparse dimension and aligning remaining two-dimensions of said three-dimensional cascaded plane architecture as two-dimensional planes;
    defining opacity values of said multiple planes and said one or more planes, if any, based on sparsity quantum of data present in said multiple planes and said one or more planes, if any, by applying a translucency algorithm, wherein said sparsity quantum of data comprises a quantity of data with null or zero values out of total values present, wherein said translucency algorithm includes transfer functions assigning an opacity;
    assigning colors or shades of colors to said multiple planes and said one or more planes, if any, based on density quantum of data present in said multiple planes and said one or more planes, if any, using an interpolation algorithm, wherein said density quantum of data comprises a quantity of data with non-zero values out of said total values present, wherein said interpolation algorithm performs one of the following: linear interpolation, polynomial interpolation, and spline interpolation;
    constructing planes of said multi-dimensional dataset using said assigned colors or shades of colors and said defined opacity values of said multiple planes and said one or more planes, if any;
    mapping said constructed planes to said multi-dimensional dataset in a form of one or more cubes and zero or more two-dimensional planes, wherein said one or more cubes and said zero or more two-dimensional planes are color coded to indicate sparsity of data present in that dimension;
    positioning one or more darkest color and least translucent sections of said multi-dimensional dataset in a center of said one or more cubes displayed in a graphical user interface from which a user analysis should begin; and
    displaying said one or more cubes and said zero or more two-dimensional planes to a user via said graphical user interface in response to positioning said one or more darkest color and least translucent sections of said multi-dimensional dataset in a center of said one or more cubes.

2. The method as recited in claim 1 further comprising:
    calculating said sparsity quantum of data of said multiple planes and said one or more planes, if any, using said density quantum of data present in said multiple planes and said one or more planes, if any.

3. The method as recited in claim 1 further comprising:
    representing a fully null data plane using a translucent color outline covering said fully null data plane.

4. The method as recited in claim 1 further comprising:
    ordering elements of each dimension of said multi-dimensional dataset based on density.

5. The method as recited in claim 4 further comprising:
    arranging dimensions of said multi-dimensional dataset in descending order based on number of dense element slices.

6. The method as recited in claim 1 further comprising:
    applying a loss based algorithm to reduce number of one or more of said multiple planes and said one or more planes, if any.

7. The method as recited in claim 1, wherein said colors or shades of colors are a function of a relative density of data in that dimension.

8. A computer program product for visualizing sparse multi-dimensional data, the computer program product comprising one or more computer readable storage mediums having program code embodied therewith, the program code comprising programming instructions for:
    converting a multi-dimensional dataset into a three-dimensional cascaded plane architecture and arranging remaining dimensions, if any, into one or more planes;
    converting sparse numeric data into multiple planes based on partitioning said three-dimensional cascaded plane architecture by a most sparse dimension and aligning remaining two-dimensions of said three-dimensional cascaded plane architecture as two-dimensional planes;

defining opacity values of said multiple planes and said one or more planes, if any, based on sparsity quantum of data present in said multiple planes and said one or more planes, if any, by applying a translucency algorithm, wherein said sparsity quantum of data comprises a quantity of data with null or zero values out of total values present, wherein said translucency algorithm includes transfer functions assigning an opacity;

assigning colors or shades of colors to said multiple planes and said one or more planes, if any, based on density quantum of data present in said multiple planes and said one or more planes, if any, using an interpolation algorithm, wherein said density quantum of data comprises a quantity of data with non-zero values out of said total values present, wherein said interpolation algorithm performs one of the following: linear interpolation, polynomial interpolation, and spline interpolation;

constructing planes of said multi-dimensional dataset using said assigned colors or shades of colors and said defined opacity values of said multiple planes and said one or more planes, if any;

mapping said constructed planes to said multi-dimensional dataset in a form of one or more cubes and zero or more two-dimensional planes, wherein said one or more cubes and said zero or more two-dimensional planes are color coded to indicate sparsity of data present in that dimension;

positioning one or more darkest color and least translucent sections of said multi-dimensional dataset in a center of said one or more cubes displayed in a graphical user interface from which a user analysis should begin; and displaying said one or more cubes and said zero or more two-dimensional planes to a user via said graphical user interface in response to positioning said one or more darkest color and least translucent sections of said multi-dimensional dataset in a center of said one or more cubes.

9. The computer program product as recited in claim 8, wherein the program code further comprises the programming instructions for:

calculating said sparsity quantum of data of said multiple planes and said one or more planes, if any, using said density quantum of data present in said multiple planes and said one or more planes, if any.

10. The computer program product as recited in claim 8, wherein the program code further comprises the programming instructions for:

representing a fully null data plane using a translucent color outline covering said fully null data plane.

11. The computer program product as recited in claim 8, wherein the program code further comprises the programming instructions for:

ordering elements of each dimension of said multi-dimensional dataset based on density.

12. The computer program product as recited in claim 11, wherein the program code further comprises the programming instructions for:

arranging dimensions of said multi-dimensional dataset in descending order based on number of dense element slices.

13. The computer program product as recited in claim 8, wherein the program code further comprises the programming instructions for:

applying a loss based algorithm to reduce number of one or more of said multiple planes and said one or more planes, if any.

14. The computer program product as recited in claim 8, wherein said colors or shades of colors are a function of a relative density of data in that dimension.

15. A system, comprising:

a memory for storing a computer program for visualizing sparse multi-dimensional data; and a processor connected to said memory, wherein said processor is configured to execute the program instructions of the computer program comprising:

converting a multi-dimensional dataset into a three-dimensional cascaded plane architecture and arranging remaining dimensions, if any, into one or more planes;

converting sparse numeric data into multiple planes based on partitioning said three-dimensional cascaded plane architecture by a most sparse dimension and aligning remaining two-dimensions of said three-dimensional cascaded plane architecture as two-dimensional planes;

defining opacity values of said multiple planes and said one or more planes, if any, based on sparsity quantum of data present in said multiple planes and said one or more planes, if any, by applying a translucency algorithm, wherein said sparsity quantum of data comprises a quantity of data with null or zero values out of total values present, wherein said translucency algorithm includes transfer functions assigning an opacity;

assigning colors or shades of colors to said multiple planes and said one or more planes, if any, based on density quantum of data present in said multiple planes and said one or more planes, if any, using an interpolation algorithm, wherein said density quantum of data comprises a quantity of data with non-zero values out of said total values present, wherein said interpolation algorithm performs one of the following: linear interpolation, polynomial interpolation, and spline interpolation;

constructing planes of said multi-dimensional dataset using said assigned colors or shades of colors and said defined opacity values of said multiple planes and said one or more planes, if any;

mapping said constructed planes to said multi-dimensional dataset in a form of one or more cubes and zero or more two-dimensional planes, wherein said one or more cubes and said zero or more two-dimensional planes are color coded to indicate sparsity of data present in that dimension;

positioning one or more darkest color and least translucent sections of said multi-dimensional dataset in a center of said one or more cubes displayed in a graphical user interface from which a user analysis should begin; and displaying said one or more cubes and said zero or more two-dimensional planes to a user via said graphical user interface in response to positioning said one or more darkest color and least translucent sections of said multi-dimensional dataset in a center of said one or more cubes.

16. The system as recited in claim 15, wherein the program instructions of the computer program further comprise:

calculating said sparsity quantum of data of said multiple planes and said one or more planes, if any, using said density quantum of data present in said multiple planes and said one or more planes, if any.

17. The system as recited in claim 15, wherein the program instructions of the computer program further comprise:

representing a fully null data plane using a translucent color outline covering said fully null data plane.

18. The system as recited in claim 15, wherein the program instructions of the computer program further comprise:

ordering elements of each dimension of said multi-dimensional dataset based on density.

19. The system as recited in claim 18, wherein the program instructions of the computer program further comprise:

arranging dimensions of said multi-dimensional dataset in descending order based on number of dense element slices.

20. The system as recited in claim 15, wherein the program instructions of the computer program further comprise:

applying a loss based algorithm to reduce number of one or more of said multiple planes and said one or more planes, if any.

* * * * *